United States Patent [19]
Smith et al.

[11] Patent Number: 5,868,927
[45] Date of Patent: Feb. 9, 1999

[54] APPARATUS AND METHOD FOR TREATING WASTE WATER FROM A RESIDENTIAL HOME

[75] Inventors: Carole M. Smith, Framingham, Mass.; Philip W. Mercer, Amherst, N.H.

[73] Assignee: Smith & Mercer, Inc., Framingham, Mass.

[21] Appl. No.: 801,262

[22] Filed: Feb. 19, 1997

Related U.S. Application Data

[63] Continuation of Ser. No. 254,599, Jun. 6, 1994, Pat. No. 5,647,980.

[51] Int. Cl.⁶ .................................................. C02F 9/00
[52] U.S. Cl. .................. 210/202; 210/195.1; 210/195.3; 210/252; 210/259; 210/748; 210/920; 210/108; 210/136; 210/295; 210/205
[58] Field of Search .................. 210/202, 195.1, 210/195.3, 252, 259, 748, 920, 108, 136, 124, 335, 295, 744, 767, 769, 770, 806, 804, 205

[56] References Cited

U.S. PATENT DOCUMENTS

| | | |
|---|---|---|
| 3,327,855 | 6/1967 | Watson . |
| 3,545,619 | 12/1970 | Ettrich . |
| 3,577,341 | 5/1971 | Keith, Jr. et al. . |
| 3,638,793 | 2/1972 | Peck . |
| 3,679,053 | 7/1972 | Koulovatos . |
| 3,709,364 | 1/1973 | Savage . |
| 3,713,543 | 1/1973 | Heaney . |
| 5,180,499 | 1/1993 | Hinson . |
| 5,254,246 | 10/1993 | Rivelli . |
| 5,374,352 | 12/1994 | Pattee . |
| 5,536,404 | 7/1996 | Drewery . |
| 5,647,980 | 7/1997 | Smith et al. . |

*Primary Examiner*—Thomas M. Lithgow
*Attorney, Agent, or Firm*—Cesari and McKenna, LLP

[57] ABSTRACT

Disclosed is a system for processing relatively small volumes of waste water such as that found in residential home use. The system first comprises a chamber adapted to hold the waste water. The system further comprises a first filter adapted to remove course material from the waste water and a second filter adapted to remove fine materials from the waste water. The system further comprises a disinfectant chamber adapted to disinfect the waste water. The system comprises a pump adapted to pump the waste water from the chamber through the first and second filters, and the disinfectant chamber.

8 Claims, 1 Drawing Sheet

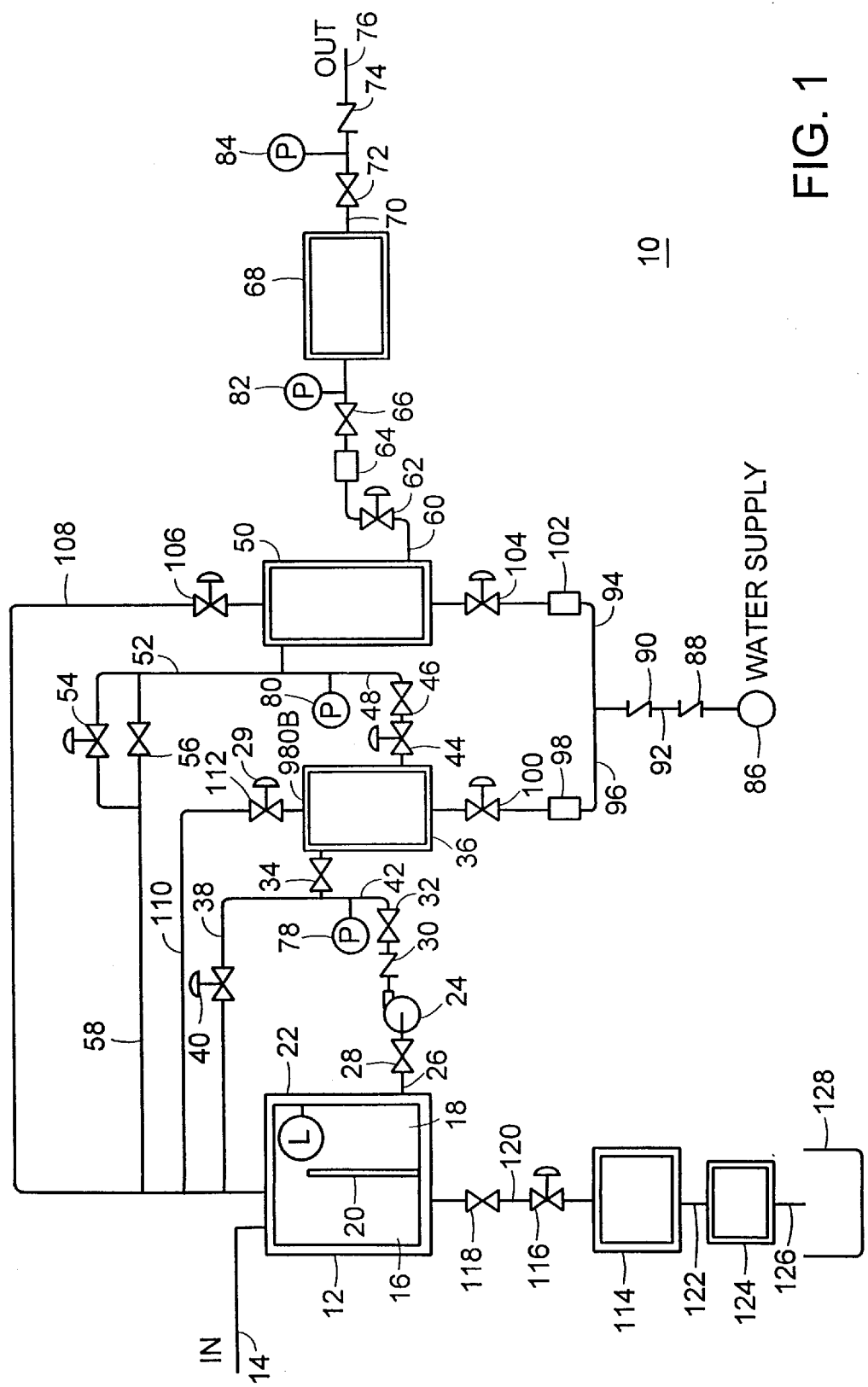

APPARATUS AND METHOD FOR TREATING WASTE WATER FROM A RESIDENTIAL HOME

RELATED APPLICATION

This is a continuation of U.S. patent application Ser. No. 08/254,599, now U.S. Pat. No. 5,647,980, filed on Jun. 6, 1994.

FIELD OF THE INVENTION

The present invention generally relates to systems and methods for treating waste water. More particularly, the present invention relates to a system and method for treating waste water from a residential home.

BACKGROUND OF THE INVENTION

It is well known that the discharge of waste water such as that from industrial plants and residential homes is a serious environmental problem. Prior to discharge, waste water from industrial plants is processed in accordance with strict state and federal regulations. In recent years, additional state and federal guidelines have been enacted with regard to the discharge of waste water from non-commercial sites such as residential homes.

Generally, waste water from residential homes is discharged in one of two ways. Where town sewage lines are available, a homeowner may connect his/her home to the town sewage system whereby the raw waste water is discharged directly to the municipal treatment plant. If access to the town sewage system is not available, however, the homeowner is forced to utilize an on-site waste water treatment and/or discharge system. Conventional systems typically do not treat the waste water and merely discharge the waste water to a septic tank and leach field where the waste water is discharged into the soil.

Conventional septic systems have several drawbacks. Because leach fields are susceptible to clogging, these systems require periodic pumping and removal of the waste water from the septic tank which can be time consuming and expensive. Leach fields also have several drawbacks. The capability of septic systems is primarily limited by the size of the leach field necessary to adequately disburse the waste water into the soil. The required size of the leach field is directly related to the volume of discharged waster water, the quality of the waste water, and the water absorbent properties of the soil.

In addition to the above problems, new local and federal regulations have been enacted which are more stringent than previous laws. This presents a problem because many of the septic systems designed and installed to meet the prior environmental laws are in need of replacement. In many cases, the new local and federal regulation would preclude replacement of the old septic system with a comparable new septic system. As such, the homeowner is faced with upgrading the capacity and/or efficiency of the old septic system.

Any upgrade would not eliminate the problems identified heretofore. A temporary relief to one problem is to increase the size of the leach field. In many situations where small or constrained lots exist, increasing the size of the leach field is impossible.

One object of the present invention is to develop a septic system for treating waste water prior to discharge. When waste water is treated before entering the septic system it will eliminate the need for a septic tank and reduce the size requirements for the leach field.

Another object of the present is to develop a septic system for treating waste water that can be easily installed within an existing residential home and which is cost effective.

SUMMARY OF THE INVENTION

The present invention is a system and method for treating waste water prior to discharge. In one embodiment, the present invention is adapted for use with residential homes so that the waste water may be treated prior to discharge to a leach field. In one embodiment, the system comprises a holding chamber adapted to retain the waste water and first and second filters adapted to remove course and fine materials from the waste water. The system also comprises a disinfectant chamber that uses ultraviolet radiation to disinfect the waste water after filtration and prior to discharge to the leach field. In operation, the untreated waste water enters the chamber and is then passed through the first and second filters to the disinfectant chamber where the waste water is disinfected. Thereafter the waste water is discharged to the leach field. Any waste water not passing through the first and second filters is returned to the holding chamber. Material from the waste water entering the system as well from the waste water not passing through the first and second filters settle at the bottom of the holding chamber to form a sludge compound.

In another embodiment, the system further comprises means for removing any sludge settling at the bottom of the holding chamber. The sludge removing means generally comprises an evaporator and an incinerator which are adapted to remove moisture from the sludge and transform the same into an ash material for periodic disposal.

In another embodiment, the system may further comprise means for cleaning the first and second filters. The cleaning means generally comprises means for providing back wash from a water supply to the first and second filter. The cleaning means may further include apparatus adapted to return the back wash to the holding chamber.

BRIEF DESCRIPTION OF THE DRAWINGS

The following detailed description will be more fully understood with reference to the accompanying drawings in which:

FIG. 1 is a schematic diagram of the system of the present invention.

DETAILED DESCRIPTION OF THE PREFERRED EMBODIMENT

The present invention is a system and method for the treatment of small volumes of waste water such as that normally found with residential homes. Although the present invention will be described with reference to it's use in connection with residential homes, it will become apparent to those skilled in the art that the present invention may be used in a variety of applications where the need for treatment of waste water and/or other liquids exists.

One embodiment of the present invention is shown in FIG. 1 where the waste water treatment system 10 comprises a chamber 12 adapted to receive waste water from a home (not shown) through an input feed line 14. The chamber 12 comprises a receiving chamber 16 and a pump chamber 18 which are separated by a wall 20. The pump chamber 18 is provided with a level controller 22 which senses the level of waste water within the pump chamber 18. When the level of waste water within the pump chamber 18 exceeds a certain predetermined level, a pump 24 (to be described) is caused to turn on. Conversely, when the level of waste water within the pump chamber 18 falls below the predetermined level, the pump 24 is caused to turn off.

Pump 24 is a conventional pump chosen to meet the flow requirements of the system 10. The supply side of pump 24 is connected by feed line 26 and isolation valve 28 to the lower portion of the pump chamber 18. Activation of the pump 24 causes the waste water contained in the pump chamber 18 to flow through a check valve 30, isolation valves 32 and 34 and long feed line 42 to a first filter 36. The first filter 36 is of conventional design and is generally adapted to filter out course materials from the waste water. If for some reason the flow resistance through the first filter 36 becomes excessive, a portion of the waste water is caused to flow along feed line 38 through a pressure actuated valve 40 and back to the chamber 12.

All of the waste water passing through the first filter 36 is thereafter pumped through a pressure activated valve 44 and an isolation valve 46 and along feed line 48 to a second filter 50. The second filter 50 is of conventional design but is generally adapted to filter out fine materials from the waste water. If for some reason the flow resistance through the second filter 50 becomes excessive, a portion of the waste water is caused to flow along feed line 52 to a parallel connection of a pressure actuated valve 54 and isolation valve 56 and along feed line 58 back to the chamber 12.

The waste water passing through the second filter 50 is thereafter pumped along feed line 60 through an isolation valve 62, a flow sensor 64 and an isolation valve 66 to a disinfectant chamber 68. Flow sensor 64 is provided so that flow rate of the waste water be monitored. The disinfectant chamber 68 is generally adapted to kill any bacteria that is present within the waste water passing through the second filter 50. In the preferred embodiment, the disinfectant chamber 68 uses ultraviolet radiation to irradiate the waste water. Waste water leaving the disinfectant chamber 68 flows along feed line 70 through an isolation valve 72 and a check valve 74 and discharged along feed line 76.

Pressure indicators 78, 80, 82 and 84 are provided to monitor the water pressure throughout the system 10.

The system 10 is also provided with means for cleaning and removing solids from the first filter 36 and the second filter 50. The preferred method cleaning the first and second filters 36 and 50 is by "back flushing." The cleaning means comprises a water supply 86 connected by a feed line 92 through isolation valves 88 and 90 to a parallel feed lines 94 and 96. Feed line 94 is connected to flow sensor 102 and pressure actuated valve 104 to the second filter 50. Similarly, feed line 96 is connected to flow sensor 98 and pressure actuated valve 100 to the first filter 36.

In operation, the first filter is back flushed by opening valves 100 and 112 and closing valves 104 and 106 which causes supply water to flow from the pressurized supply along feed line 92 and 96 through the first filter 36 and back to the chamber 12 along feed line 110. To back flush the second filter 50, valves 104 and 106 are opened and valves 100 and 112 are closed which causes water from the supply to flow along feed line 92 and 94 through the second filter 50 and back to the chamber 12 along feed line 108.

With the system 10 as heretofore described, waste water containing unfiltered solids are collected in the receiving chamber 16 and such solids tend to settle at the bottom of the receiving chamber 16. As such, a sludge forms on the bottom of the receiving chamber 6 which is a mixture of the entering solids and water and filter condensate that has been back flushed to the receiving chamber 16. The sludge has a much higher solids content than the waste water present in the rest of the system 10. When the system 10 is at rest the solids tend to settle to the bottom of the receiving chamber 16.

The system 10 is also provided with means for removing the sludge from the receiving chamber 16. In one embodiment the sludge removing means comprises an evaporator 114 connected along feed line 166 and through pressure activated valve 116 and isolation valve 118 to the bottom of the receiving chamber 16. The evaporator 114 may be of conventional design and is generally adapted to remove moisture from the sludge. The sludge removing means may further comprises an incinerator 124 connected to the evaporator 114 along line 122. The incinerator 124 may be of conventional design and is generally adapted to incinerate and transform the dried sludge into ash. The sludge removing means may further comprises a container 128 to receive the ash for periodic disposal. In operation, the sludge may removed by opening valve 116 which causes the sludge to flow through isolation valve 118, through valve 116 to the evaporator 114 where moisture is removed from the sludge, The dried sludge is then passed to the incinerator 124 wherein the dried sludge is incinerated to ash. The ash is then retained in the container 128 for periodic disposal.

The majority and/or all of the components of the system 10, including the chamber 12, pump 24, first filter 36, second filter 50, disinfectant chamber 68, evaporator 114 and incinerator 124 are preferably contained within a single housing. The housing would provide access to all of the various valves so the same could be turned off and on. The housing would also provide access to the major components such as the pump should a component require repair and/or replacement. The housing would also provide access to the container 128 for disposal of the ash.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A system for processing raw waste water containing coarse and fine materials, the system comprising:

a chamber adapted to receive the waste water, the chamber including a settling chamber having a lower portion and an upper portion, constructed and arranged so that the coarse materials and the fine materials settle at the lower portion in response to gravity and a pump chamber in communication with the settling chamber, and wherein the upper portion includes an outlet, constructed and arranged to enable waste water to flow from the settling chamber to the pump chamber when the waste water within the settling chamber attains a predetermined volume;

a pump, interconnected with the pump chamber, for directing the waste water from the pump chamber in a downstream direction;

a coarse filter interconnected with the pump, the coarse filter being constructed and arranged to remove the coarse materials from the waste water, the coarse filter including a coarse filter outlet for discharging filtered water therefrom;

a fine filter interconnected with the coarse filter, the fine filter being constructed and arranged to remove the fine materials from the waste water, the fine filter including a fine filter outlet for discharging filtered water therefrom;

a back wash source in communication with the coarse filter to direct back wash flow in an upstream direction so that the coarse materials are forced upstream out of the coarse filter and back into the settling chamber and also in communication with the fine filter to direct back wash flow in an upstream direction so that the fine materials are forced upstream out of the fine filter and back into the settling chamber;

a first valve located between the backwash source and the coarse filter and a second valve located between the backwash source and the fine filter each for selectively providing backwash flow to each of the coarse filter and the fine filter, respectively;

wherein the backwash source comprises a water source remote from and free of interconnection with each of the coarse filter outlet and the fine filter outlet;

a first passage between the pump and an inlet of each the coarse filter and the fine filter that carries the waste water in a downstream direction and a second passage that returns backwash from each of the coarse filter and the fine filter at predetermined times;

a check valve located on the first passage that restricts flow in an upstream direction and that enables flow in a downstream direction;

a pressure sensor assembly located on the first passage and in communication with the inlet of each of the coarse filter and the fine filter, the pressure sensor assembly being operatively connected to each of the first valve and the second valve for selectively opening at least one of the first valve and the second valve in response to a predetermined inlet backpressure level at least one of the coarse filter and the fine filter;

a sludge outlet located at the lower portion of the settling tank for removing the fine materials and the coarse materials.

2. The system as set forth in claim 1 wherein the pump chamber includes a level sensor operatively interconnected with the pump wherein the pump operates in response to the level sensor.

3. The system as set forth in claim 2 further comprising a disinfectant chamber located downstream of each of the coarse filter and the fine filter, the disinfectant chamber constructed and arranged to disinfect the waste water.

4. The system as set forth in claim 3 further comprising a waste water outlet, in communication with an outside environment, downstream of the disinfectant chamber.

5. The system as set forth in claim 1 further comprising a sludge dryer in communication with the sludge outlet and a dried sludge outlet for removing sludge from the sludge dryer.

6. The system as set forth in claim 5 wherein the sludge dryer comprises an evaporator.

7. The system as set forth in claim 6 wherein the sludge dryer includes a sludge incinerator.

8. The system as set forth in claim 7 further comprising a housing for enclosing each of the chamber, the coarse filter and the fine filter.

\* \* \* \* \*